United States Patent
Okada et al.

(10) Patent No.: US 11,080,167 B2
(45) Date of Patent: Aug. 3, 2021

(54) ARITHMETIC PROCESSING APPARATUS AND INFORMATION PROCESSING SYSTEM

(71) Applicant: SONY SEMICONDUCTOR SOLUTIONS CORPORATION, Kanagawa (JP)

(72) Inventors: Takahiro Okada, Saitama (JP); Tadaaki Yuba, Kanagawa (JP); Jun Ueshima, Tokyo (JP); Shinichi Tsuchida, Kanagawa (JP); Ken Matsumoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 33 days.

(21) Appl. No.: 16/478,292

(22) PCT Filed: Dec. 14, 2017

(86) PCT No.: PCT/JP2017/044910
§ 371 (c)(1),
(2) Date: Jul. 16, 2019

(87) PCT Pub. No.: WO2018/139097
PCT Pub. Date: Aug. 2, 2018

(65) Prior Publication Data
US 2019/0361796 A1 Nov. 28, 2019

(30) Foreign Application Priority Data

Jan. 26, 2017 (JP) .............................. JP2017-011863

(51) Int. Cl.
G06F 9/44 (2018.01)
G06F 11/36 (2006.01)
(Continued)

(52) U.S. Cl.
CPC ........ *G06F 11/3656* (2013.01); *G06F 9/3001* (2013.01); *G06F 9/3824* (2013.01); *G06F 9/3867* (2013.01); *G06F 9/3877* (2013.01)

(58) Field of Classification Search
CPC .. G06F 11/3656; G06F 9/3001; G06F 9/3824; G06F 9/3867; G06F 9/3877
See application file for complete search history.

(56) References Cited

U.S. PATENT DOCUMENTS 5,828,824 A * 10/1998 Swoboda ......... G01R 31/31705
714/25
5,933,651 A * 8/1999 Masuda .................... G06F 9/38
712/42
(Continued)

FOREIGN PATENT DOCUMENTS

CN 1427335 A 7/2003
JP 2001-154877 A 6/2001
(Continued)

OTHER PUBLICATIONS

International Search Report and Written Opinion of PCT Application No. PCT/JP2017/044910, dated Mar. 20, 2018, 07 pages of ISRWO.

*Primary Examiner* — Cheng Yuan Tseng
(74) *Attorney, Agent, or Firm* — Chip Law Group

(57) ABSTRACT

A debug work is performed with respect to states after execution of a plurality of commands which is collectively issued from a processor to an arithmetic processing apparatus. A command register group holds commands issued from the processor in respective registers with a command chain including a plurality of commands as a unit. A command processing section processes the commands supplied from the command register group. A state machine manages processing states of the commands in the command processing section. A control section previously sets a con-
(Continued)

dition under which stop is to be performed in the command chain as a stop condition and causes to stop the processing in the command processing section on the basis of the previously set stop condition and the processing states managed in the state machine.

9 Claims, 13 Drawing Sheets

(51) Int. Cl.
  *G06F 9/30* (2018.01)
  *G06F 9/38* (2018.01)

(56) References Cited

U.S. PATENT DOCUMENTS

| | | | | |
|---|---|---|---|---|
| 6,154,856 | A * | 11/2000 | Madduri | G06F 11/348 712/227 |
| 6,330,623 | B1 * | 12/2001 | Wu | G06F 13/28 710/23 |
| 6,446,173 | B1 * | 9/2002 | Pham | H04L 12/462 709/238 |
| 6,553,513 | B1 * | 4/2003 | Swoboda | G06F 11/3656 714/25 |
| 6,557,116 | B1 * | 4/2003 | Swoboda | G06F 11/3656 714/27 |
| 6,564,339 | B1 * | 5/2003 | Swoboda | G06F 11/3656 714/25 |
| 6,567,933 | B1 * | 5/2003 | Swoboda | G06F 11/3656 710/59 |
| 6,681,280 | B1 | 1/2004 | Miyake et al. | |
| 6,704,895 | B1 * | 3/2004 | Swoboda | G01R 31/318536 714/30 |
| 6,807,609 | B1 * | 10/2004 | Lemmon | G06F 13/161 711/150 |
| 6,877,113 | B2 * | 4/2005 | Saruwatari | G06F 11/3636 714/34 |
| 7,076,420 | B1 * | 7/2006 | Snyder | G06F 11/3656 703/28 |
| 7,114,093 | B2 * | 9/2006 | Tardieux | G06F 1/04 713/600 |
| 2003/0110329 | A1 | 6/2003 | Higaki et al. | |
| 2003/0120970 | A1 * | 6/2003 | Chen | G06F 11/261 714/25 |
| 2006/0179289 | A1 * | 8/2006 | Floyd | G06F 9/30123 712/227 |
| 2007/0226467 | A1 * | 9/2007 | Chaudhry | G06F 9/3836 712/217 |
| 2011/0029757 | A1 * | 2/2011 | Nakajima | G06F 9/3877 712/34 |
| 2014/0168245 | A1 * | 6/2014 | Fahs | G06T 1/60 345/533 |
| 2020/0218540 | A1 * | 7/2020 | Kesiraju | G06F 9/3877 |

FOREIGN PATENT DOCUMENTS

| | | |
|---|---|---|
| JP | 2003-208412 A | 7/2003 |
| JP | 2008-269390 A | 11/2008 |
| KR | 10-2001-0082536 A | 8/2001 |

* cited by examiner

FIG. 5

```
1    BreakSet(DMA_M2L1+CAL0);           // BREAKPOINT SETTING

2    DmaMainToLocalR32(adrA, L0, 128);  // Ai DOWNLOAD
3    DmaMainToLocalR32(adrF, L1, 128);  // Fi DOWNLOAD
4    DmaMainToLocalNop();               // NOP
5    OperationMul32(L0, L1, L2, 128);   // Xi ← f(Ai, Fi)
6    OperationNop();                    // NOP
7    DmaLocalToMainR32(adrX, L2, 128);  // Xi UPLOAD
8    DmaLocalToMainNop();               // NOP

9                 :
```

Lines 2–8: COMMAND CHAIN 1

Line 9: COMMAND CHAIN 2

F I G . 6
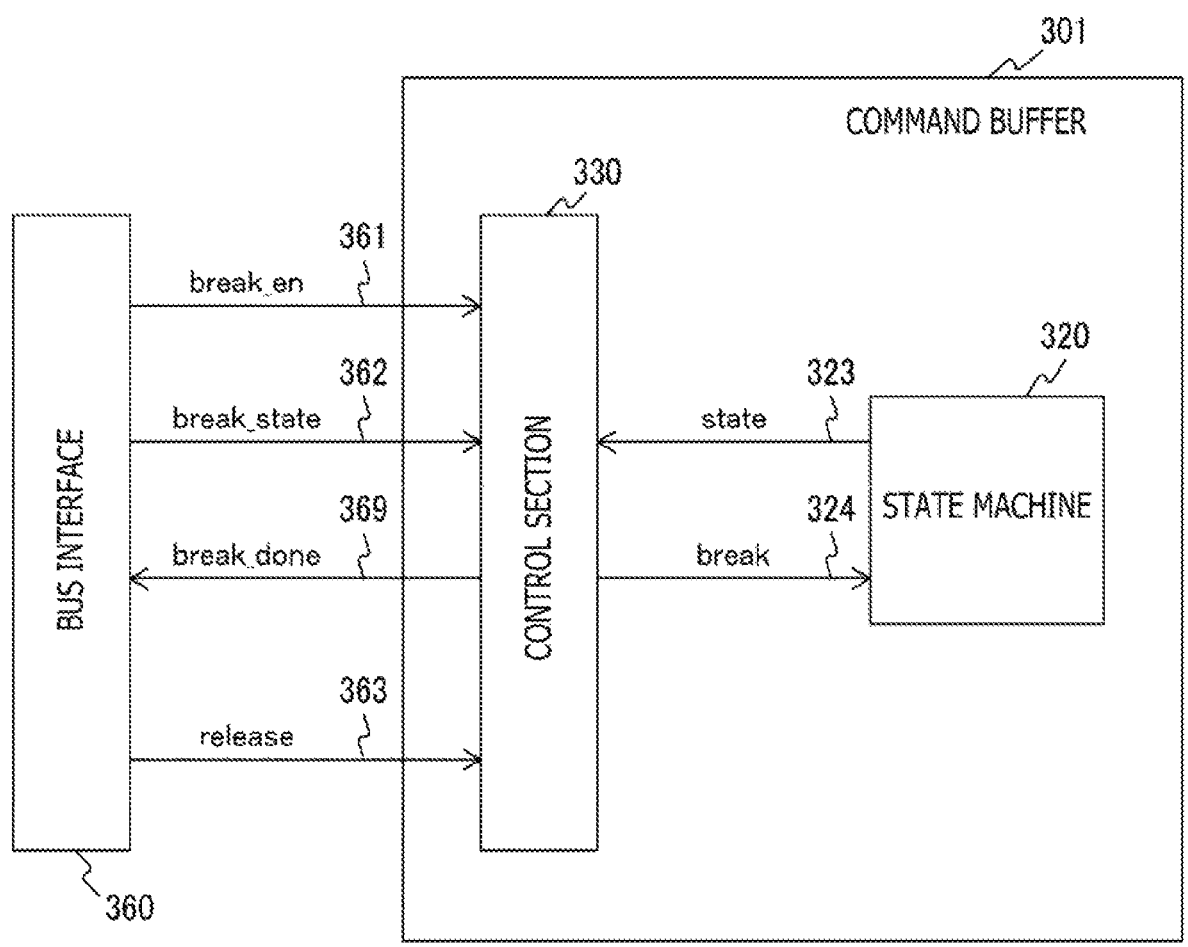

ARITHMETIC PROCESSING APPARATUS AND INFORMATION PROCESSING SYSTEM

CROSS REFERENCE TO RELATED APPLICATIONS

This application is a U.S. National Phase of International Patent Application No. PCT/JP2017/044910 filed on Dec. 14, 2017, which claims priority benefit of Japanese Patent Application No. JP 2017-011863 filed in the Japan Patent Office on Jan. 26, 2017. Each of the above-referenced applications is hereby incorporated herein by reference in its entirety.

TECHNICAL FIELD

The present technology relates to an arithmetic processing apparatus. More particularly, the present technology relates to an arithmetic processing apparatus providing an arithmetic function in an outside of a processor, and an information processing system including the arithmetic processing apparatus.

BACKGROUND ART

When a debug work is performed in an information processing system, in general, a breakpoint is set by using an In-Circuit Emulator (ICE), and the verification of a source code is performed while a status register or the like provided inside the hardware is confirmed. In such a target system for the debug, in such a case as to process a plurality of commands issued from a processor in parallel to one another in an arithmetic processing apparatus, processing for a new command is stopped, and how the previously started processing is treated becomes a problem. For example, there is proposed a processor performing a debug operation in a command processing section processing a command in a pipeline system (e.g., refer to PTL 1).

CITATION LIST

Patent Literature

[PTL 1]
Japanese Patent Laid-Open No. 2008-269390

SUMMARY

Technical Problem

In the related art described above, since the processing for the command is stopped in a command processing section processing commands by using the pipeline system, for a period of time from stop of input of the command to completion of the processing which has been started before the stop, the debug operation is limited. However, in case of waiting for the completion of all the pieces of started processing, an internal state becomes different between a time of the debug operation and a time of the actual execution, and thus the debug work may not be suitably performed. That is, there is a problem that it may be impossible to confirm a status of the inside of the hardware or a value of a local memory at the time point of the completion of each command issued from the processor to an arithmetic processing apparatus.

The present technology has been created in the light of such a situation, and it is therefore desirable to perform a debug work with respect to states of executions of a plurality of commands which is collectively issued from a processor to the arithmetic processing apparatus.

Solution to Problem

The present technology has been made in order to solve the problem described above, and a first aspect of the present technology is an arithmetic processing apparatus including a command register group holding commands issued from a processor in respective registers with a command chain including a plurality of commands as a unit; a command processing section processing the commands supplied from the command register group; a state machine managing processing states of the commands in the command processing section; and a control section previously setting a condition under which stop is to be performed in the command chain as a stop condition and causing to stop the processing in the command processing section on the basis of the previously set stop condition and the processing states managed in the state machine.

In addition, in the first aspect, the control section may cause to stop processing in the command processing section at a time point at which processing for the commands fulfilling the stop condition ends without waiting for end of processing for all commands in the command chain. As a result, there is offered an action that the processing is caused to be stopped without waiting for the end of all the commands in the command chain.

In addition, in the first aspect, the control section may set a plurality of the processing states in the command processing section as the stop condition. As a result, there is offered an action that the processing is caused to be stopped in a plurality of the processing states.

In addition, in the first aspect, the control section, when receiving a command to release processing stop from the processor, may cause to resume processing in the command processing section. As a result, there is offered an action that the processing is resumed from a position where the command chain is stopped.

In addition, in the first aspect, the state machine may cause to make transition of the processing states in accordance with the number of commands previously decided in response to the command chain to manage the processing state. As a result, there is offered an action that the state is managed by a simple method based on the number of commands.

In addition, in the first aspect, the command register group may include a plurality of sub-register groups, and the control section may perform the control in such a way that when receiving a plurality of the command chains from the processor, the different command chains are held for each of the plurality of sub-register groups. As a result, there is offered an action that the different command chains are caused to be operated in parallel.

In addition, in the first aspect, the state machine may manage the peculiar processing states in response to the different command chains, respectively. As a result, there is offered an action that the operation is performed on the basis of the peculiar state for each command chain.

In addition, in the first aspect, the control section, in a case where the stop condition is fulfilled in one of a plurality of the command chains, may cause to stop the processing in the command processing section even in the other command chains. As a result, there is offered an action that the pieces of processing in a plurality of the command chains are stopped in conjunction with one another.

In addition, in the first aspect, the control section, in a case where the stop condition is fulfilled in one of a plurality of the command chains, may cause to stop the processing in the command processing section at a time point at which the processing for the command being processed in the other command chains is ended. As a result, there is offered an action that the processing for the other command chains at the time point at which the processing for the command being processed in one command chain ends, the processing for the other command chains is stopped.

In addition, a second aspect of the present technology is an information processing system including a processor issuing a plurality of commands with a command chain including the commands as a unit; a command register group holding the commands issued from the processor in respective registers; a command processing section processing the commands supplied from the command register group; a state machine managing processing states of the commands in the command processing section; and a control section previously setting a condition under which stop is to be performed in the command chain as a stop condition and causing to stop the processing in the command processing section on the basis of the previously set stop condition and the processing states managed in the state machine. As a result, there is offered an action that the processing is caused to be stopped on the basis of the stop condition which is previously set in the command chain including a plurality of commands which is collectively issued from the processor and the processing state managed in the state machine.

Advantageous Effect of Invention

According to the present technology, the excellent effect that the debug work can be performed with respect to the state after pieces of execution of a plurality of commands which is collectively issued from the processor to the arithmetic processing apparatus can be offered. It should be noted that the effect described here is not necessarily limited, and any of the effects described in the present disclosure may be offered.

BRIEF DESCRIPTION OF DRAWINGS

FIG. 5 is a diagram depicting an example of a command chain in the embodiment of the present technology.

FIG. 6 is a block diagram depicting an example of control signals of a control section 330 in the first embodiment of the present technology.

DESCRIPTION OF EMBODIMENTS

Hereinafter, modes for carrying out the present technology (hereinafter, referred to as embodiments) will be described. The description will be given in accordance with the following order.

1. First Embodiment (an example in which processing is stopped at a time point at which processing for one command of an issued command chain is ended)

2. Second Embodiment (an example in which when processing is stopped in any one of a plurality of command chains, other command chains are stopped in conjunction with the stop)

1. First Embodiment

[Configuration of Information Processing System]

Figure 1:
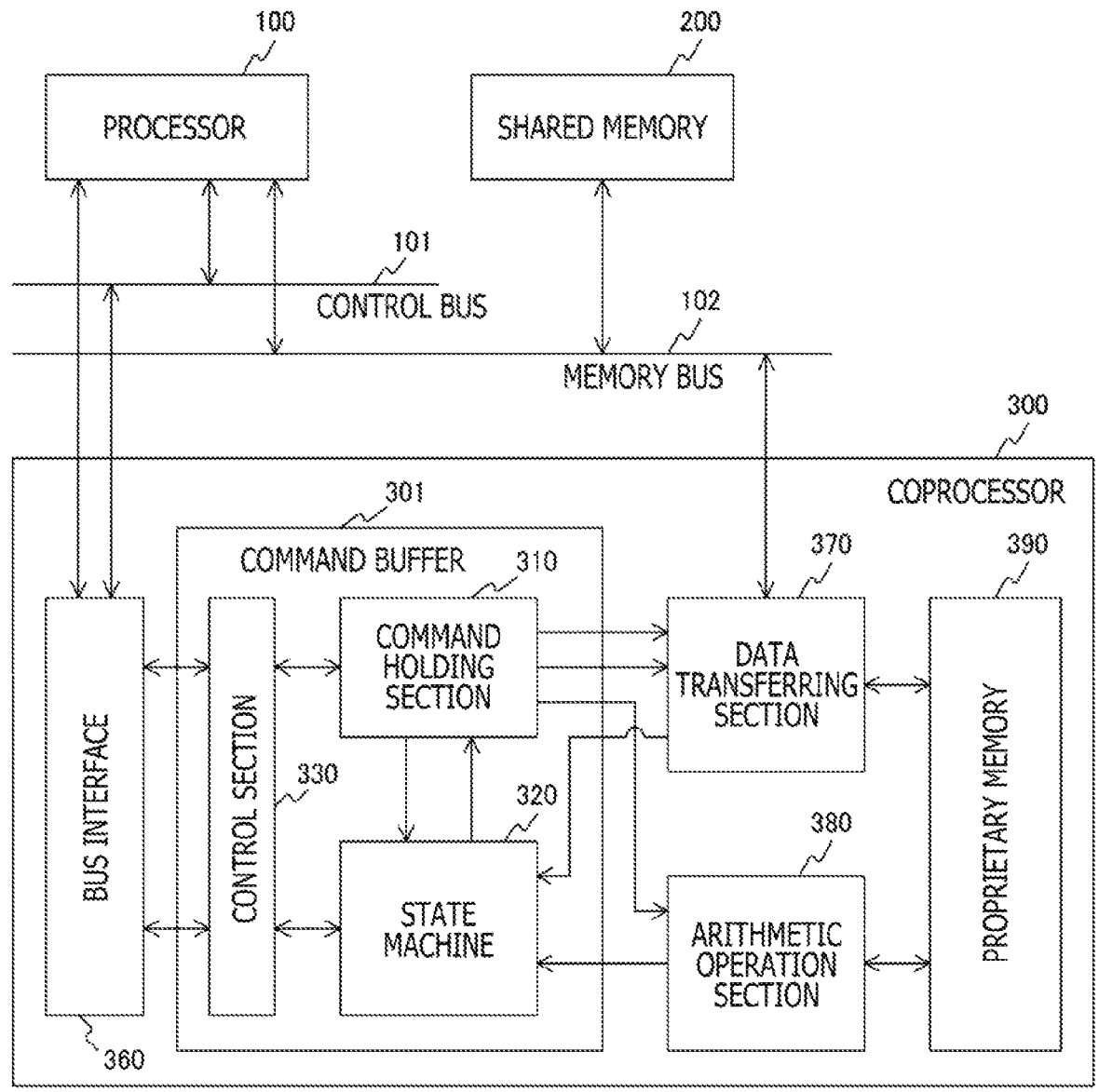
FIG. 1 is a block diagram depicting an example of a configuration of an information processing system in an embodiment of the present technology.

FIG. 1 is a block diagram depicting an example of a configuration of an information processing system in an embodiment of the present technology. The information processing system includes a processor 100, a shared memory 200, and a coprocessor 300. These constituent elements are connected to one another by a control bus 101 and a memory bus 102.

The processor 100 is an apparatus executing processing of the entire information processing system. The coprocessor 300 is an arithmetic processing apparatus executing predetermined arithmetic processing or the like in accordance with an instruction issued from the processor 100. The shared memory 200 is a memory storing an address space of the processor 100. Both the processor 100 and the coprocessor 300 can access the shared memory 200. It should be noted that the coprocessor 300 is an example of an arithmetic processing apparatus described in CLAIMS.

The coprocessor 300 includes a command buffer 301, a bus interface 360, a data transferring section 370, an arithmetic operation section 380, and a proprietary memory 390. The command buffer 301 includes a command holding section 310, a state machine 320, and a control section 330.

The command buffer 301 includes a command holding section 310 holding a dedicated control command therein. The dedicated control command is written from the processor 100 to the command holding section 310 via the control bus 101.

The state machine 320 manages processing states in the data transferring section 370 and the arithmetic operation section 380.

The command holding section 310 holds commands of a command chain received from the processor 100. The command holding section 310 holds the commands in accordance with control by the control section 330.

The control section 330 controls the command holding section 310. The control section 330 controls the command holding section 310 in such a way that the commands of the command chain received from the processor 100 are held. In addition, the control section 330 controls the command holding section 310 in such a way that the command held in the command holding section 310 is supplied to any of the data transferring section 370 and the arithmetic operation section 380 in accordance with the processing state managed by the state machine 320.

The bus interface 360 is an interface provided between the control bus 101 and the command buffer 301. The processor 100 and the command buffer 301 provided within the coprocessor 300 are connected to each other via the control bus 101.

The proprietary memory 390 is a memory storing a proprietary area different from an address space of the processor 100.

The arithmetic operation section 380 executes arithmetic processing between pieces of data stored in the proprietary memory 390.

The data transferring section 370 executes processing for transferring the data between the address space of the processor 100, and the proprietary memory 390. The data transferring section 370, when executing the processing for transferring the data, performs direct memory access (DMA) transfer between the shared memory 200 and the proprietary memory 390. For this reason, during the DMA transfer, a start address, an amount of transferred data, and the like are set to the data transferring section 370. The data transferring section 370, the processor 100, and the shared memory 200 are connected to one another via the memory bus 102.

The data transferring section 370 and the arithmetic operation section 380 are each connected to the proprietary memory 390. The data transferring section 370 and the arithmetic operation section 380 can execute access for reading from and writing to the proprietary memory 390. It should be noted that the data transferring section 370 and the arithmetic operation section 380 are an example of a processing section described in CLAIMS.

Figure 2:
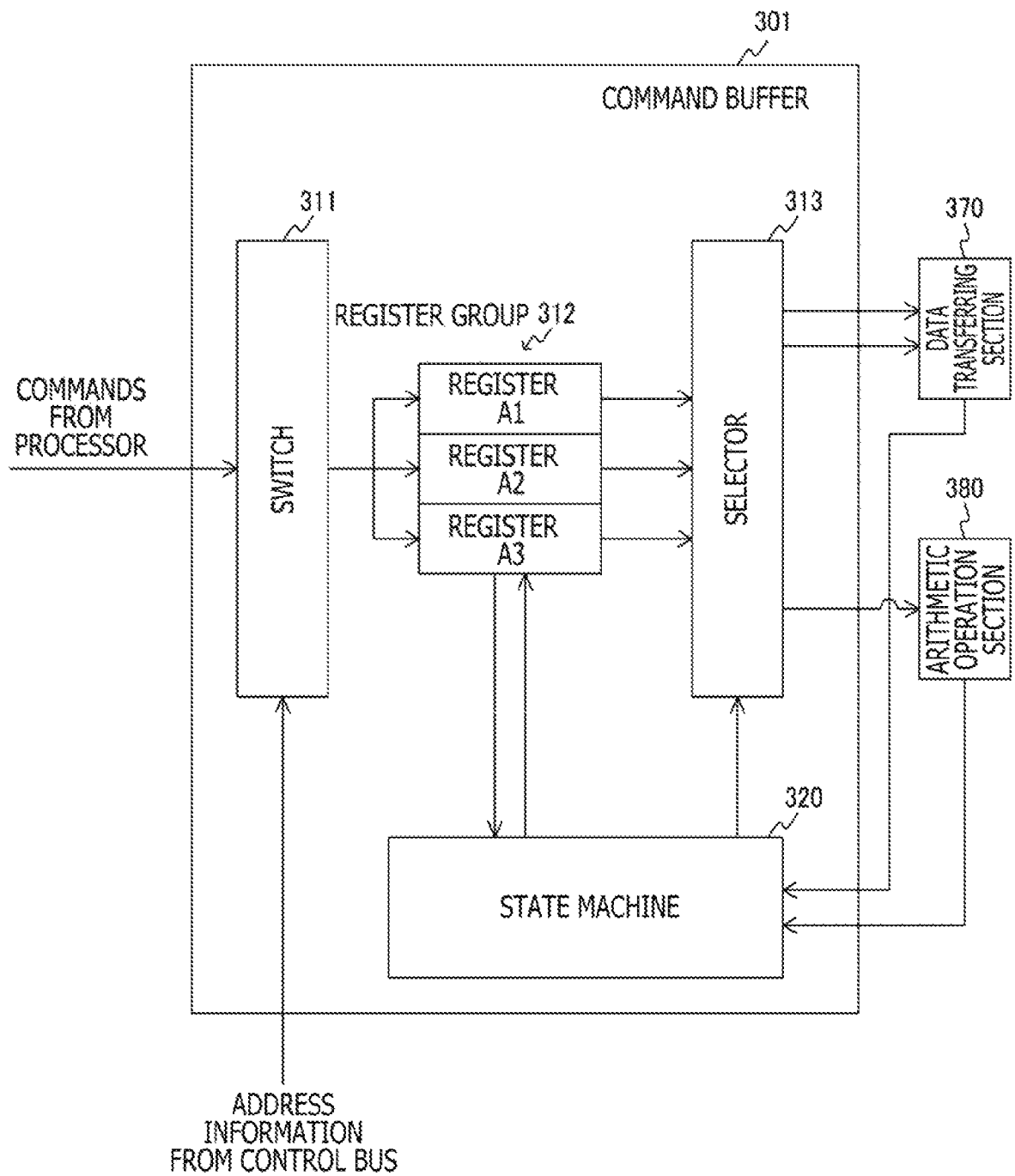
FIG. 2 is a block diagram depicting an example of a configuration of a command buffer 301 in the first embodiment of the present technology.

FIG. 2 is a block diagram depicting an example of a configuration of the command buffer 301 in the first embodiment of the present technology. The command buffer 301 includes a register group 312, a switch 311, a selector 313, and the state machine 320.

The register group 312 is registers holding the commands of the command chain received from the processor 100. In this example, the register group 312 includes registers A1 to A3. The register A1 is a register holding the command to the data transferring section 370 when the data in the shared memory 200 is written to the proprietary memory 390. The register A2 is a register holding the command to the arithmetic operation section 380. The register A3 is a register holding the command to the data transferring section 370 when the data in the proprietary memory 390 is written to the shared memory 200. These registers A1 to A3 have a first-in first-out (FIFO) function which can store a plurality of commands, and can read out the commands in the order in which the commands are stored. It should be noted that the register group 312 is an example of a command register group described in CLAIMS.

The switch 311 is a switch allocating the commands from the processor 100 to the registers A1 to A3. The switch 311 decides the selection of the address of any of the registers A1 to A3 in accordance with address information from the control bus 101.

The selector 313 is a selector selecting an output from any one of the registers A1 to A3 and supplying the selected output to either the data transferring section 370 or the arithmetic operation section 380. The outputs from the registers A1 and A3 are supplied to the data transferring section 370. The output from the register A2 is supplied to the arithmetic operation section 380.

The state machine 320 is a state machine managing the processing states in the data transferring section 370 and the arithmetic operation section 380. The transition of the processing states managed by the state machine 320 will be described later.

Figure 3:
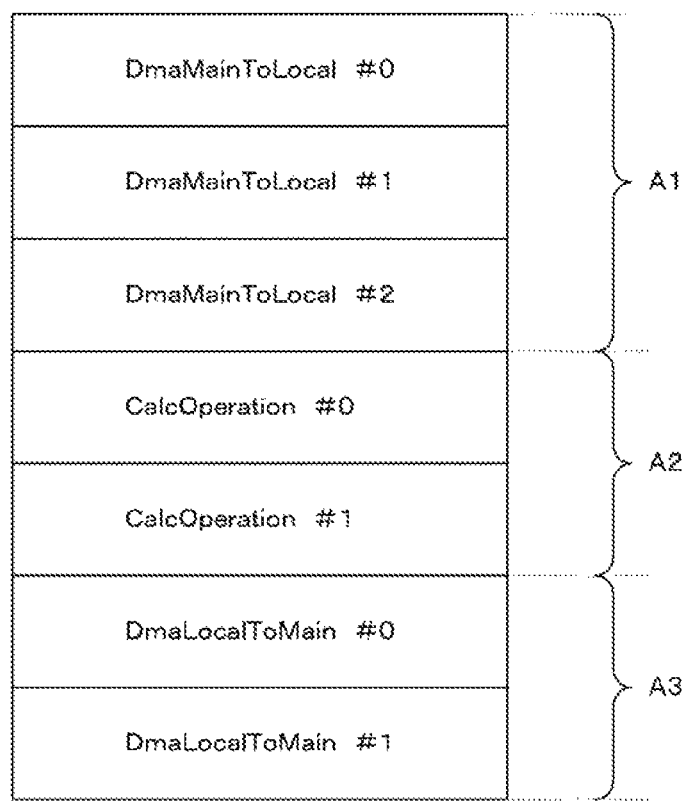
FIG. 3 is a diagram depicting an example of a relationship between a register group 312 and commands in the first embodiment of the present technology.

FIG. 3 is a diagram depicting an example of a relationship between the register group 312 and the commands in the first embodiment of the present technology. In this case, it is supposed that seven commands are included in the command chains which are collectively issued from the processor 100 to the coprocessor 300. These seven commands are held in the registers A1 to A3 in the manner described below.

The register A1 holds DmaMainToLocal commands in accordance with which the data in the shared memory 200 is to be transferred to the proprietary memory 390. In this example, the register A1 has an area in which three DmaMainToLocal commands are held.

The register A2 holds CalcOperation commands which are to be executed in the arithmetic operation section 380. In this example, the register A2 has an area in which two CalcOperation commands are held.

The register A3 holds a DmaLocalToMain command in accordance with which the data in the proprietary memory 390 is transferred to the shared memory 200. In this example, the register A3 has an area in which two DmaLocalToMain commands are held.

Figure 4:
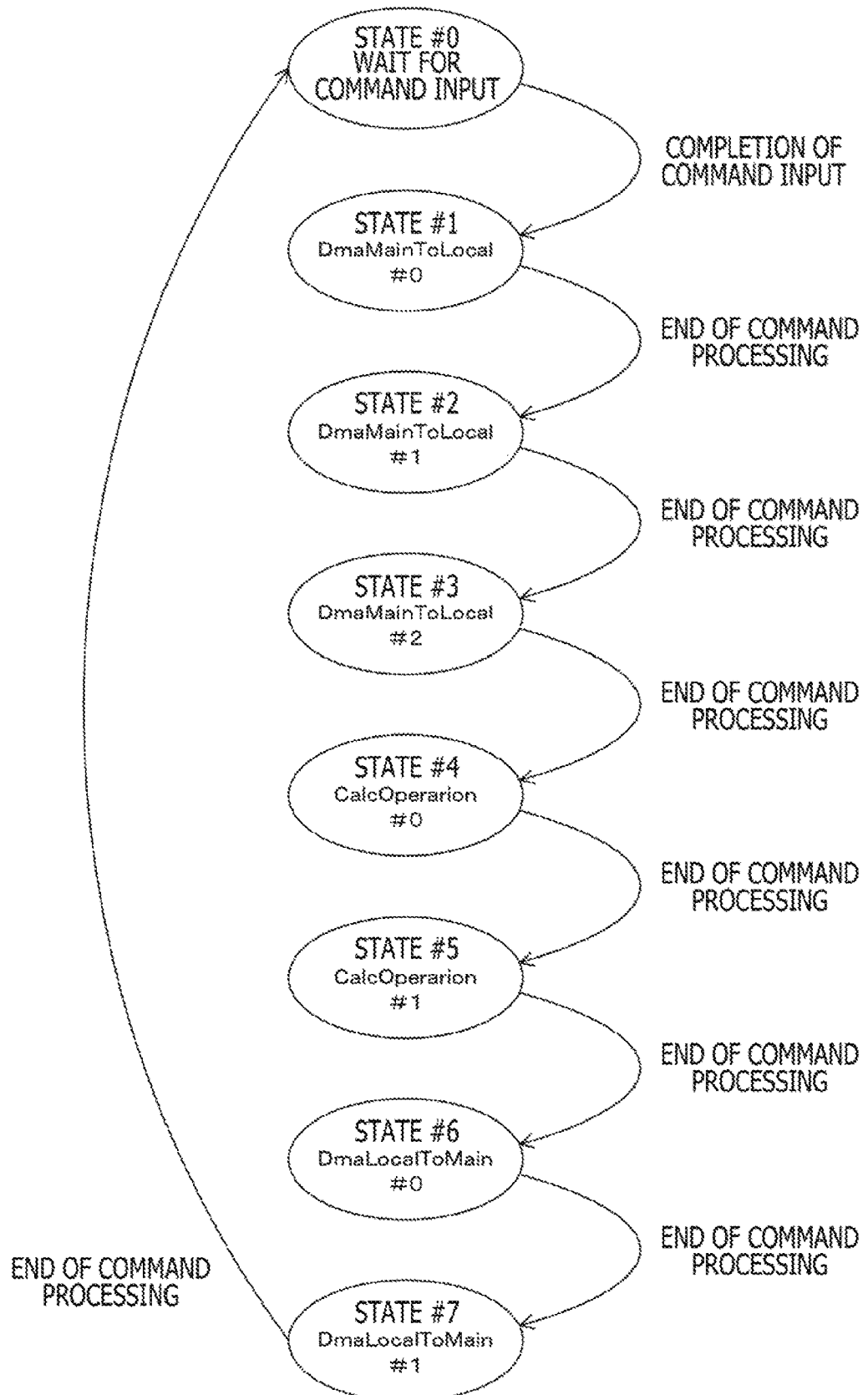
FIG. 4 is a diagram depicting an example of transition of a processing state which a state machine 320 in the first embodiment of the present technology manages.

FIG. 4 is a diagram depicting an example of transition of a processing state managed by the state machine 320 in the first embodiment of the present technology.

A state #0 is a state in which the register group 312 does not hold the command, and waits for input of the command from the processor 100. When the command chain is inputted from the processor 100 in this state #0, the state makes the transition to a next state #1.

The state #1 is a state in which a first command (DmaMainToLocal #0) of the commands in accordance with which the data transferring section 370 performs data transfer from the shared memory 200 to the proprietary memory 390 is being executed. When in the state #1, the data transfer from the shared memory 200 to the proprietary memory 390 is ended, the state makes the transition to a next state #2. Likewise, the state #2 is a state in which DmaMainToLocal #1 is being executed. When the data transfer is ended, the state makes the transition to a state #3. In addition, the state #3 is a state in which DmaMainToLocal #2 is being executed. When the data transfer is ended, the state makes the transition to a state #4.

The state #4 is a state in which the first command (CalcOperation #0) of the commands in accordance with which the arithmetic operation section 380 performs the arithmetic operation is being executed. When in the state #1, the arithmetic operation of the arithmetic operation section 380 is ended, the state makes the transition to a next state #5. Likewise, the state #5 is a state in which the CalcOperation #1 is being executed. When the arithmetic operation is ended, the state makes the transition to a next state #6.

The state #6 is a state in which the first command (DmaLocalToMain #0) of the commands in accordance with which the data transferring section 370 performs the data transfer from the proprietary memory 390 to the shared memory 200 is being executed. When the data transfer from the proprietary memory 390 to the shared memory 200 is ended in the state #6, the state makes the transition to a next state #7. Likewise, the state #7 is a state in which the first command (DmaLocalToMain #1) is being executed. When the data transfer is ended, the state makes the transition to the original state #0.

In these state transitions, a method of making the transition after waiting for the notifications of the processing end from the function blocks, and a method of automatically executing next processing after stand by for a given time can be each adopted. In addition, with respect to the processing for the commands, it is assumed that the number of commands necessary for the pieces of the processing is previously decided. As a result, the state machine 320 can make the transition of the state without executing decoding processing for the commands.

FIG. 5 is a diagram depicting an example of the command chain in the embodiment of the present technology. The command chain can be realized as firmware which operates on the processor 100.

The processor 100 issues the command to the coprocessor 300 with the command chain as a unit. Before the issuance, in order to perform the debug work, a BreakSet command in accordance with which a breakpoint is set between the commands is provided in a first line. The BreakSet command sets an execution stop position (breakpoint) so as to stop (break operation) the execution of the command chain when the processing for the command specified in the command chain is ended.

A condition under which the stop should be performed in the command chain which is set in accordance with the BreakSet command is referred to as a stop condition. In this example, since it is assumed that the command chain, as described above, includes seven commands, the stop condition includes 1 bit per command, that is, 7 bits in total. As a result, the setting can be performed in such a way that at a time point at which one or more arbitrary commands of the seven commands have been ended, the processing is stopped. In this example, the breakpoints are respectively set in the second command of the commands in accordance with which the data transferring section 370 performs the data transfer from the shared memory 200 to the proprietary memory 390, and the first command of the commands in accordance with which the arithmetic operation section 380 performs the arithmetic operation.

DmaMainToLocal R32 (adrA, L0, 128) in a second line is a first command of the commands in accordance with which the data transfer is performed from the shared memory 200 to the proprietary memory 390. This command is a command in accordance with which 128 pieces of data having a real number of 32 bits are DMA-transferred (downloaded) from an address adrA of the shared memory 200 to an address L0 of the proprietary memory 390. The data transferred in accordance with this command is used as a vector Ai.

DmaMainToLocalR32 (adrF, L1, 128) in a third line is a second command of the commands in accordance with which the data transfer is performed from the shared memory 200 to the proprietary memory 390. This command is a command in accordance with which 128 pieces of data having a real number of 32 bits are DMA-transferred (downloaded) from an address adrF of the shared memory 200 to an address L1 of the proprietary memory 390. The data transferred in accordance with this command is used as a vector Fi.

DmaMainToLocalNop( ) in a fourth line is a third command of the commands in accordance with which the data transfer is performed from the shared memory 200 to the proprietary memory 390. However, this command prescribes no operation (NOP) operation in which the DMA transfer is not performed at this timing. Therefore, the DMA transfer is not performed in accordance with this command.

OperationMul32 (L0, L1, L2, 128) in a fifth line is a first command of the commands in accordance with which the arithmetic operation section 380 performs the arithmetic operation. This command is a command in accordance with which 128 pieces of data having 32 bits stored in an address L0 of the proprietary memory 390 is multiplied by 128 pieces of data having 32 bits stored in an address L1 of the proprietary memory 390, and the resulting data is stored in an address L2 of the proprietary memory 390. The data obtained by the arithmetic operation in accordance with this command is used as a vector Xi.

OperationNop( ) in a sixth line is a second command of the commands in accordance with which the arithmetic operation section 380 performs the arithmetic operation. However, this command prescribes the NOP operation in which the arithmetic operation is not performed at this timing. Therefore, the arithmetic operation is not performed in accordance with this command.

DmaLocalToMainR32 (adrX, L2, 128) in the seventh line is a first command of the commands in accordance with which the data transfer is performed from the proprietary memory 390 to the shared memory 200. This command is a command in accordance with which 128 pieces of data having the real number of 32 bits are DMA-transferred (uploaded) from an address L2 of the proprietary memory 390 to an address adrX of the shared memory 200. The data which is transferred in accordance with this command is the vector Xi obtained through the arithmetic operation in the fifth line.

DmaLocalToMainNop( ) in an eighth line is a second command of the commands in accordance with which the data transfer is performed from the proprietary memory 390 to the shared memory 200. However, this command prescribes the NOP operation in which the DMA transfer is not performed at this timing. Therefore, the DMA transfer is not performed in accordance with this command.

The commands from the second line to the eighth line configures the command chain 1. That is, these seven commands are collectively issued as the command chain 1 from the processor 100 to the coprocessor 2. At the time of the debug operation, since the breakpoints are respectively set in the third line and the fifth line, the operation of the command chain 1 is stopped at the time of the end of the commands in the third line and at the time of the end of the command in the fifth line.

FIG. 6 is a block diagram depicting an example of control signals of the control section 330 in the first embodiment of the present technology. The control section 330 includes signal lines 361, 362, 363, and 369 between the control section 330 and the bus interface 360. In addition, the control section 330 includes signal lines 323 and 324 between the control section 330 and the state machine 320.

The signal line 361 is a signal line for transmitting a break_en signal instructing whether or not the breakpoint setting from the processor 100 to the control section 330 is valid. The control section 330, when the break_en signal indicates the validity, the stop condition is fulfilled, then, performs the break operation.

The signal line 362 is a signal line for transmitting a break_state signal used to set the stop condition for the break operation from the processor 100 to the control section 330. As described above, since in this example, it is supposed that the command chain includes the seven commands, the break_state signal has a 7-bit width.

The signal line 369 is a signal line for, when the stop condition for the break operation is fulfilled to stop the processing, transmitting a break_done signal with which the effect is reported from the control section 330 to the processor 100.

The signal line 363 is a signal line for transmitting a release signal with which the break operation is released from the processor 100 to the control section 330.

The signal line 323 is a signal line for transmitting a state signal indicating the processing states in the data transferring section 370 and the arithmetic operation section 380 from the state machine 320 to the control section 330. Since as described above, in this example, the eight processing states are supposed and all it takes is to indicate one of the eight processing states, a 3-bit width is enough for the state signal.

The signal line 324 is a signal line for, when the stop condition for the break operation is fulfilled, transmitting a break signal instructing the stop of the processing from the control section 330 to the state machine 320.

In a case where when a break_en signal indicates the validity, the processing state indicated by the state signal supplied from the state machine 320 fulfills the stop condition set by the break_state signal, the control section 330 performs the break operation. That is, the control section 330 transmits the break signal instructing the stop of the processing to the state machine 320 and transmits the break_done signal to the processor 100 as well.

During the stop of the processing for the command chain, an intra-hardware status, a value in a local memory and the like are collected as the debug work. Thereafter, in order to resume the processing, the processor 100 transmits a release signal with which the break operation is released to the control section 330. As a result, the control section 330 releases the break signal for the state machine 320. It should be noted that although it is supposed that the release signal is inputted to the processor 100 via an in-circuit emulator (ICE), the release of the release signal may also be performed by the firmware which operates on the processor 100.

[Operation of Information Processing System]

Figure 7:
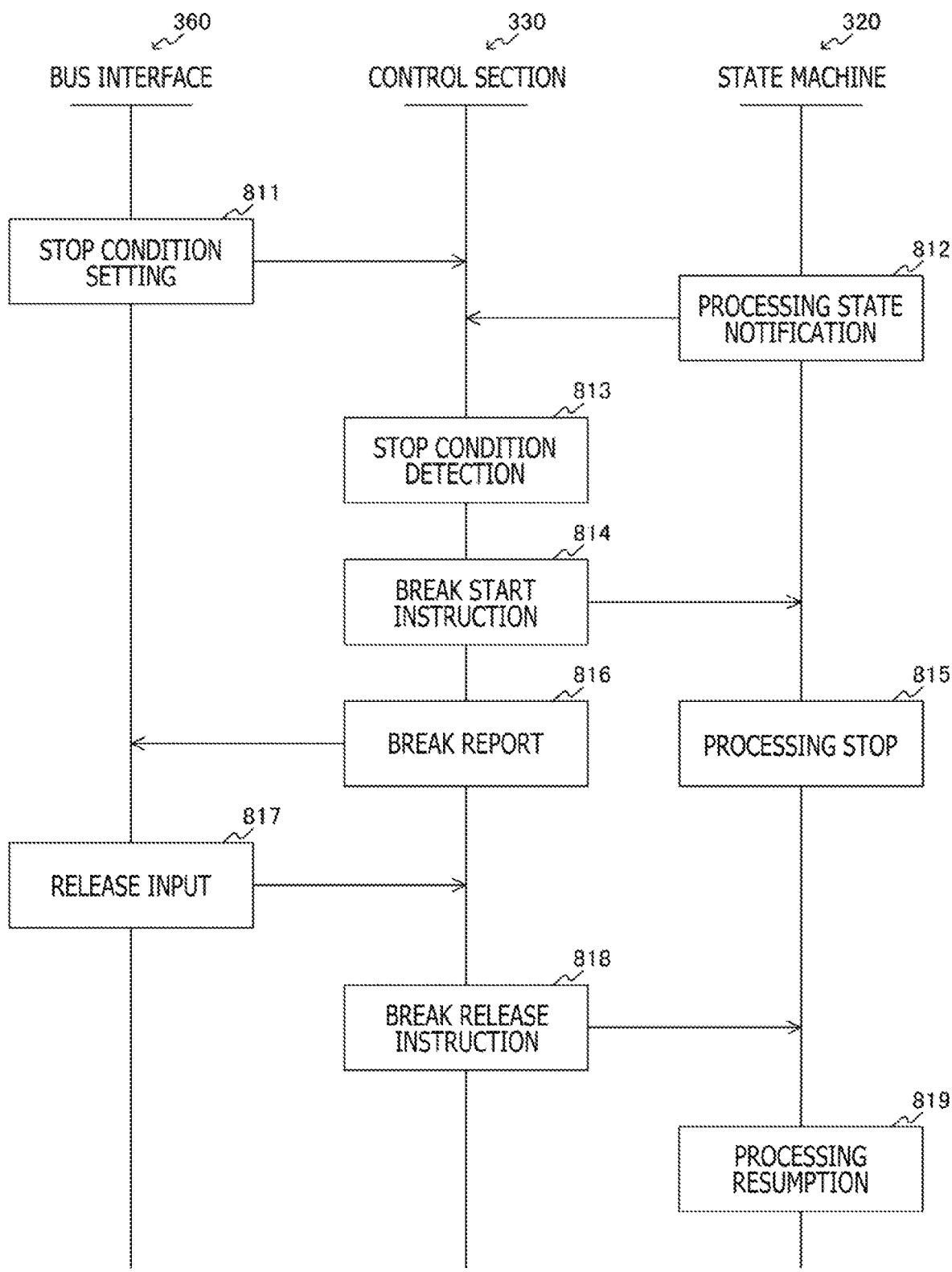
FIG. 7 is a sequence diagram depicting an example of an operation of the information processing system in the first embodiment of the present technology.

FIG. 7 is a sequence diagram depicting an example of an operation of the information processing system in the first embodiment of the present technology.

When the setting of the stop condition is instructed from the processor 100 before the execution of the command chain 1 (811), the stop condition is set in the control section 330 via the bus interface 360. When the processing for the command chain 1 is started, the control section 330 is suitably notified of the processing state managed in the state machine 320 (812).

The control section 330 monitors the processing state notified from the state machine 320 and decides whether or not the previously set stop condition is fulfilled. Then, when the control section 330 detects that the set stop condition is fulfilled (813), the control section 330 instructs the state machine 320 to start the break (814). As a result, the state machine 320 stops the state transition, the supply of the commands from the command holding section 310 is stopped, and the processing for the command chain is stopped to become the break state (815).

In addition, when the control section 330 detects that the stop condition is fulfilled (813), the control section 330 reports the generation of the break state to the processor 100 via the bus interface 360 (816). After the debug work is performed, a release signal is inputted from the processor 100 to the control section 330 via the bus interface 360 (817).

In response to the reception of the release signal, the control section 330 instructs the state machine 320 to release the break state (818). As a result, the state machine 320 resumes the state transition, and the supply of the commands from the command holding section 310 is resumed, so that the processing for the command chain is resumed to release the break state (819).

Figure 8:
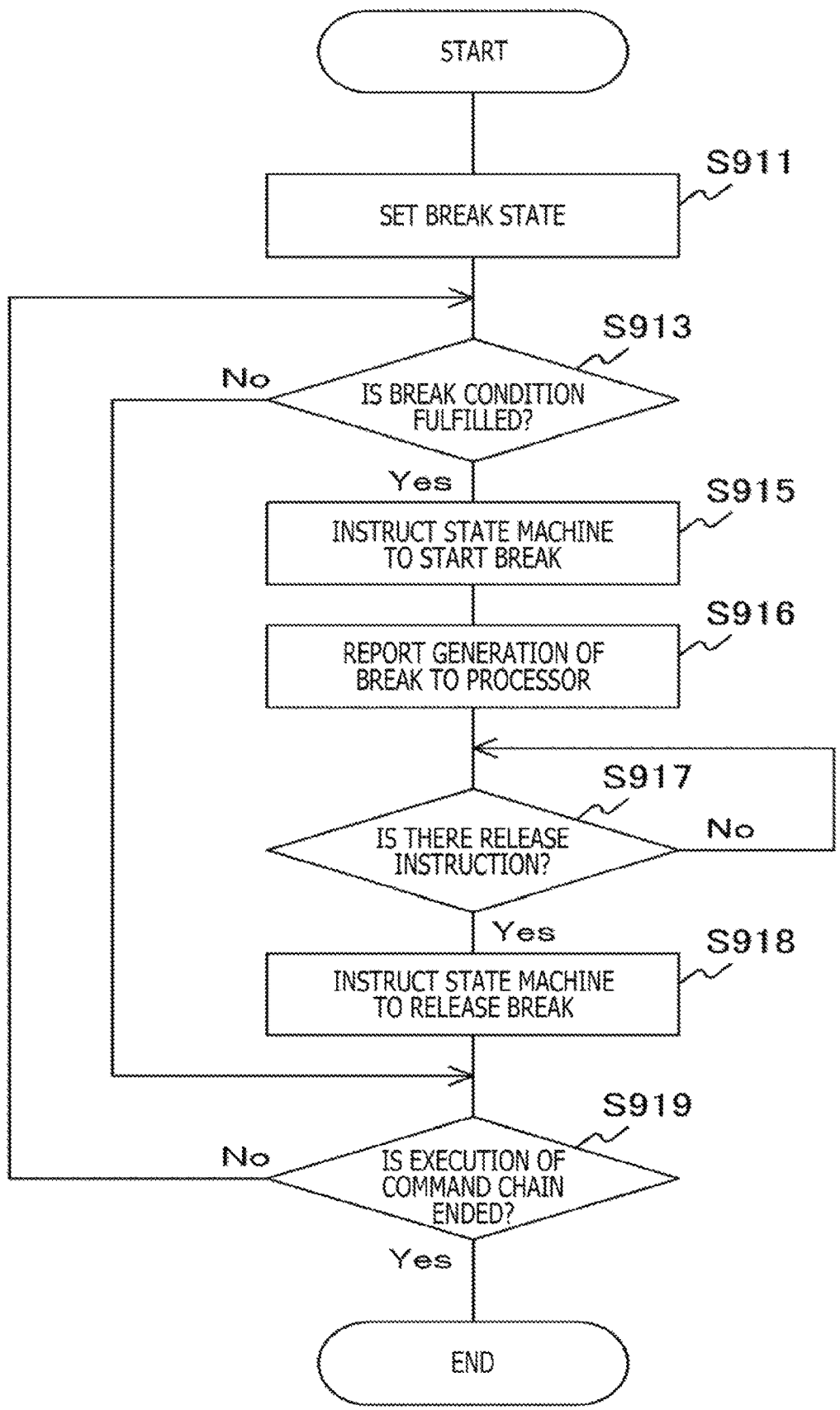
FIG. 8 is a flow chart depicting an example of a processing procedure in the control section 330 in the first embodiment of the present technology.

FIG. 8 is a flow chart depicting an example of a processing procedure in the control section 330 in the control section 330 in the first embodiment of the present disclosure.

When the control section 330 is instructed to set the stop condition from the processor 100, the control section 330 sets the stop condition (Step S911). When the processing for the command chain 1 is started, the control section 330 monitors the processing state notified from the state machine 320 and decides whether or not the set stop condition is fulfilled (Step S913).

Then, when the control section 330 detects that the set stop condition is fulfilled (813) (Yes: Step S913), the control section 330 instructs the state machine 320 to start the break (Step S915). As a result, the break state is obtained. At this time, the control section 330 reports the generation of the break state to the processor 100 (Step S916).

Thereafter, when the control section 330 receives the release signal from the processor 100 (Yes: Step S917), the control section 330 instructs the state machine 320 to release the break state (step S918). As a result, the break state is released.

Either in the case where the stop condition is not detected (No: Step S913) or in the case where the break state is released (Step S918), it is decided whether or not the execution of the command chain is ended (Step S919). When the execution of the command chain is ended (Yes: Step S919), this processing procedure is ended. On the other hand, in the case where the execution of the command chain is not ended (No: Step S919), the pieces of processing in and after Step S913 are repetitively executed.

As described above, according to the first embodiment of the present technology, the processing states of the commands in the command chain which is collectively issued from the processor 100 to the coprocessor 300 are monitored, thereby enabling the debug work to be performed in units of the commands.

2. Second Embodiment

Although in the first embodiment described above, it is supposed that one set of command chains is held in the command buffer 301 of the coprocessor 300, a plurality of sets of command chains may be held in the command buffer 301 of the coprocessor 300. In the second embodiment, it is supposed that a plurality of sets of command chains is held in the command buffer 301, and these sets of command chains are executed in parallel. It should be noted that since an entire configuration of an information processing system is similar to that in the first embodiment described above, a detailed description thereof is omitted.

[Configuration of Information Processing System]

Figure 9:
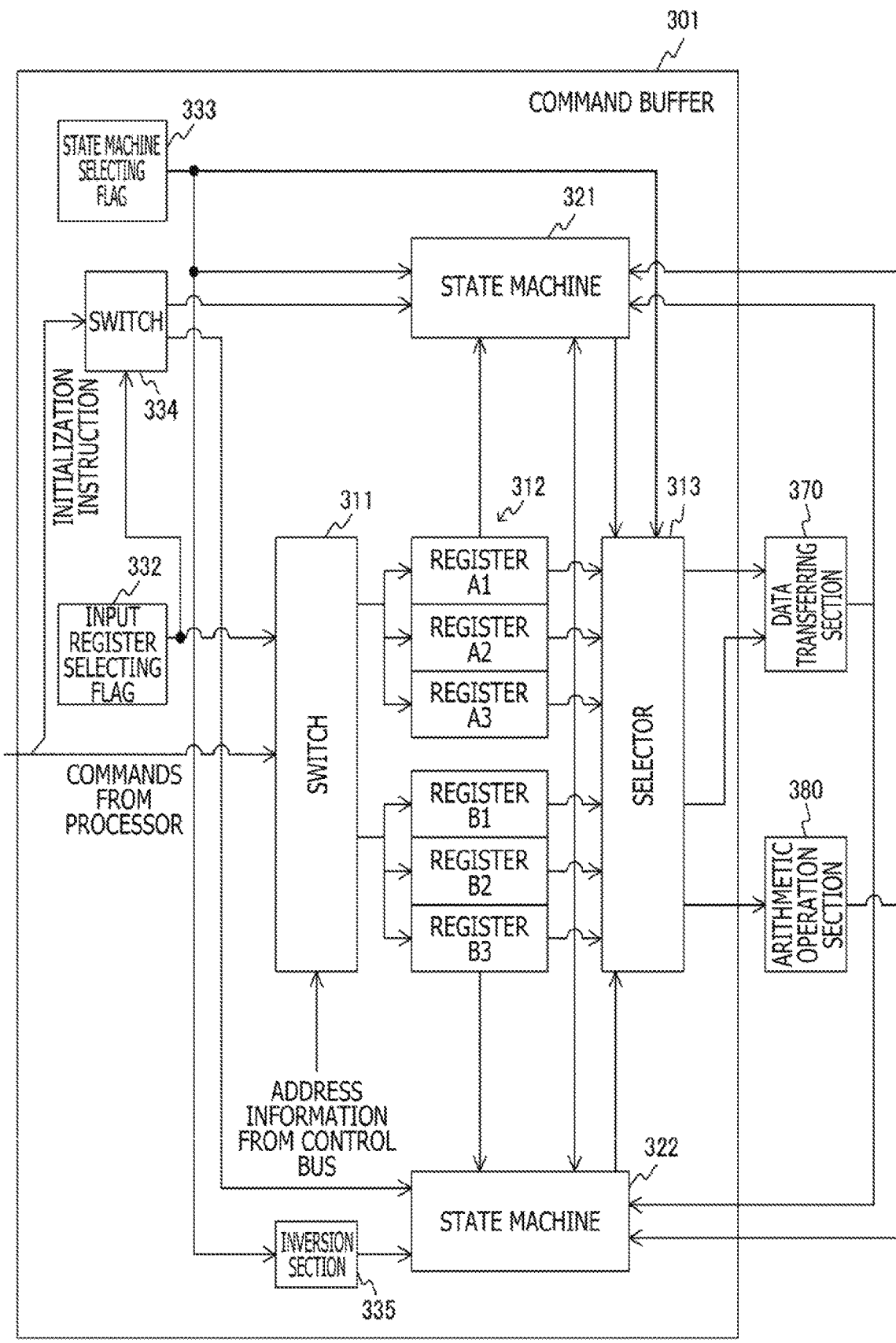
FIG. 9 is a block diagram depicting an example of a configuration of a command buffer 301 in a second embodiment of the present technology.

FIG. 9 is a block diagram depicting an example of a configuration of the command buffer 301 in the second embodiment of the present disclosure.

In the second embodiment, a register group 312 is configured so as to hold two sets of command chains. That is, the register group 312 includes registers A1 to A3 holding a first command chain and registers B1 to B3 holding a second command chain. It should be noted that the registers A1 to A3 and the registers B1 to B3 are an example of a plurality of sub-register groups described in CLAIMS.

In addition, in the second embodiment, the command buffer 301 includes two state machines 321 and 322 so as to correspond to the two sets of command chains, respectively. That is, the state machine 321 manages the processing state of the first command chain, and the state machine 322 manages the processing state of the second command chain.

In addition, the command buffer 301 in the second embodiment includes an input register selecting flag 332, a state machine selecting flag 333, a switch 334, and an inversion section 335.

The input register selecting flag 332 is a flag with which the switch 311 decides which of the registers A1 to A3 or B1 to B3 the command is inputted to. The switch 311 decides which of the registers A1 to A3 or B1 to B3 the command is inputted to in accordance with the input register selecting flag 332.

The state machine selecting flag 333 is a flag for selecting any one of the state machines 321 and 322. A value of the state machine selecting flag 333 is supplied to each of the state machines 321 and 322, and the selector 313. When the value of the state machine selecting flag 333 indicates "0," the processing is executed in accordance with the processing state managed by the state machine 321. On the other hand, when the value of the state machine selecting flag 333 indicates "1," the processing is executed in accordance with the processing state managed by the state machine 322.

The register group 312 is initialized prior to the writing of a new command chain. For this reason, an initialization command of the registers is supplied to the state machine 321 or 322 via the switch 334. The switch 334 is a switch allocating the initialization command to any one of the state machines 321 and 322. The switch 334 decides which of the registers A1 to A3 or B1 to B3 the initialization command is inputted to in accordance with the input register selecting flag 332.

The inversion section 335 is a circuit inverting the value of the state machine selecting flag 333. As a result, the values opposite to each other shall be supplied from the state machine selecting flag 333 to each of the state machines 321 and 322.

The switches 334 and 311 are controlled in accordance with the value of the input register selecting flag 332. That is, when the value of the input register selecting flag 332 indicates "0," the switch 311 writes the commands to the registers A1 to A3. In addition, at this time, the switch 334 supplies the initialization signal from the processor 100 to the state machine 321. On the other hand, when the value of the input register selecting flag 332 indicates "1," the switch 311 writes the commands to the registers B1 to B3. In addition, at this time, the switch 334 supplies the initialization signal from the processor 100 to the state machine 322.

Figure 10:
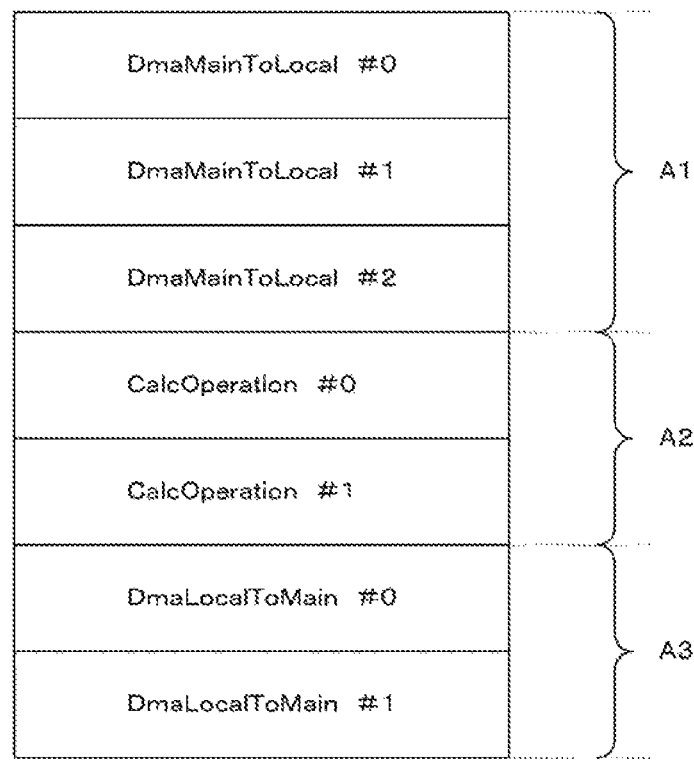
FIG. 10 is a diagram depicting an example of a relationship between a register group 312 and commands in the second embodiment of the present technology.
Figure 10:
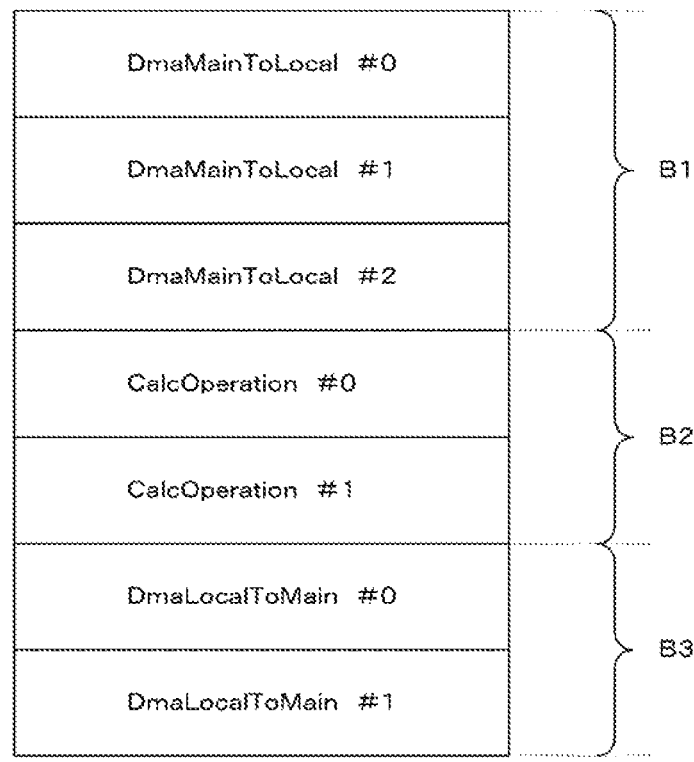

FIG. 10 is a diagram depicting an example of a relationship between the register group 312 and the commands in the second embodiment of the present technology. In this case, it is supposed that seven commands collectively issued from the processor 100 to the coprocessor 300 are included in one command chain. The seven commands of the first command chain are held in the registers A1 to A3, and the seven commands of the second command chain are held in the registers B1 to B3.

Since the contents of the commands which are held in these registers A1 to A3 and B1 to B3 are similar to those in the first embodiment described above, a detailed description thereof is omitted.

Figure 11:
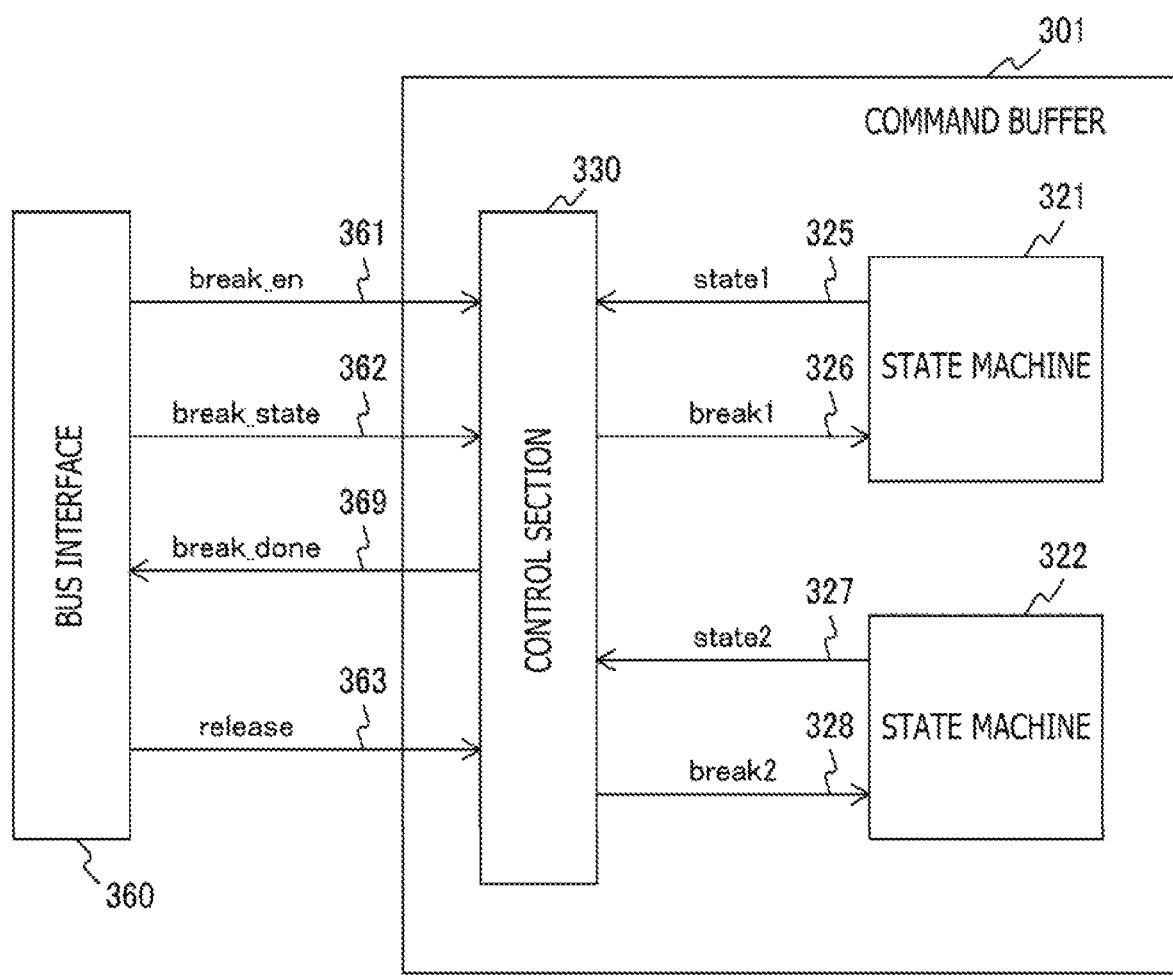
FIG. 11 is a block diagram depicting an example of control signals of the control section 330 in the second embodiment of the present technology.

FIG. 11 is a block diagram depicting an example of the control signals of the control section 330 in the second embodiment of the present technology. It is similar to the first embodiment described above that the control section 330 includes the signal lines 361, 362, 363, and 369 between the control section 330 and the bus interface 360. On the other hand, the control section 330 includes signal lines 325 and 326 between the control section 330 and the state machine 321, and includes signal lines 327 and 328 between the control section 330 and the state machine 322.

The signal line 325 is a signal line for transmitting a state1 signal indicating the processing states in the data transferring section 370 and the arithmetic operation section 380 from the state machine 321 to the control section 330. The signal line 326 is a signal line for transmitting the break1 signal which, when the stop condition for the break operation is fulfilled, instructs the stop of the processing from the control section 330 to the state machine 321.

The signal line 327 is a signal line for transmitting a state2 signal indicating the processing states in the data transferring section 370 and the arithmetic operation section 380 from the state machine 322 to the control section 330. The signal line 328 is a signal line for transmitting a break2 signal which, when the stop condition for the break operation is fulfilled, instructs the stop of the processing from the control section 330 to the state machine 322.

The control section 330 monitors either the processing state indicated by a state1 signal supplied from the state machine 321 or the processing state indicated by the state2 signal supplied from the state machine 322. In the case where either of the state1 signal or the state2 signal fulfills the stop condition set by the break_state signal when the break_en signal indicates the validity, the break operation is performed. That is, the control section 330 transmits the break1 signal and the break2 signal instructing the stop of the processing to the state machines 321 and 322, and transmits the break_done signal to the processor 100.

During the stop of the processing for the command chain, an intra-hardware status, a value in a local memory and the like are collected as the debug work. Thereafter, in order to resume the processing, the processor 100 transmits a release signal with which the break operation is to be released to the control section 330. As a result, the control section 330 releases the break signal for the state machines 321 and 322.

Figure 12:
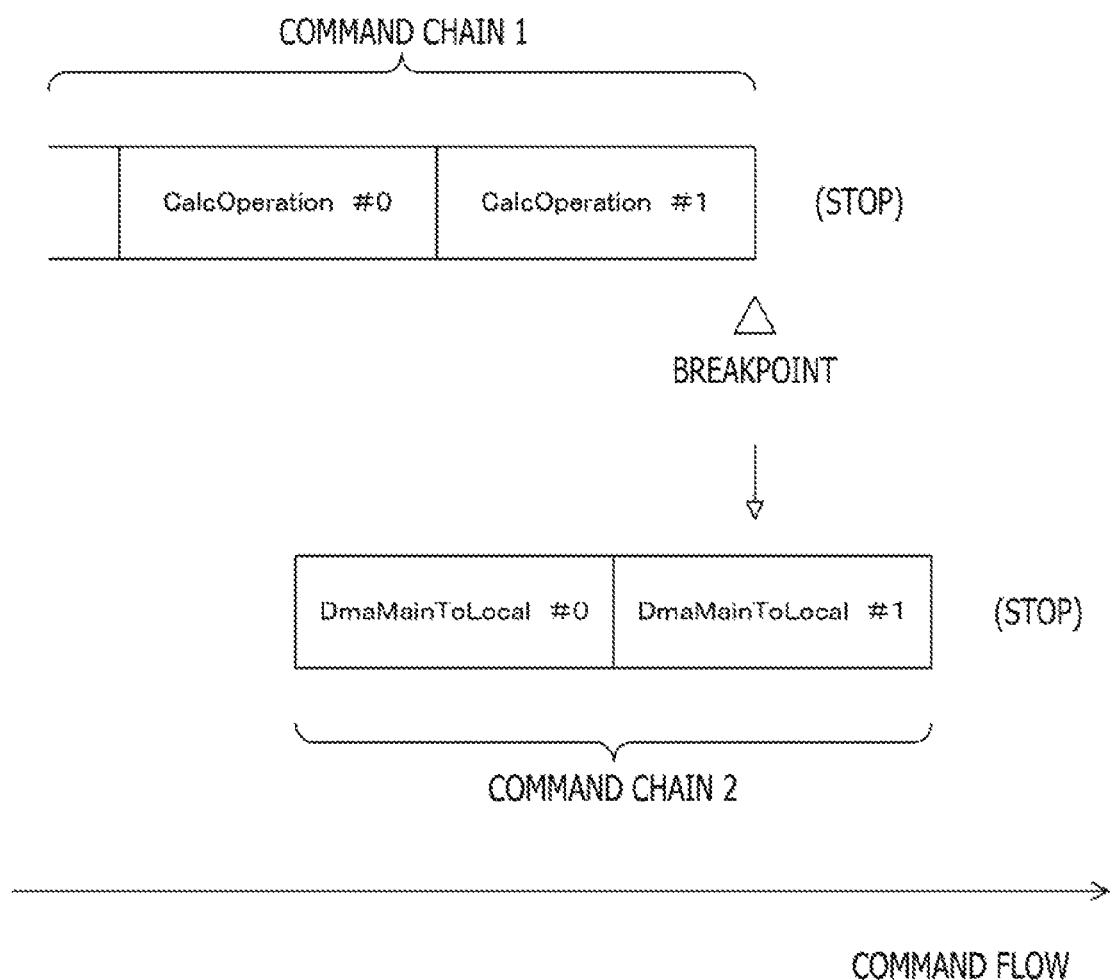
FIG. 12 is a diagram depicting an example of break interlocking between a plurality of command chains in the second embodiment of the present technology.

FIG. 12 is a diagram depicting an example of break interlocking between a plurality of command chains in the second embodiment of the present technology. In the example, it is supposed that CalcOperation in the preceding command chain 1, and DmaMainToLocal in the following command chain 2 are processed in parallel.

In the case where the breakpoint is set at a time point of the end of CalcOperation #1 in the preceding command chain 1, when CalcOperation #1 is ended, the stop condition is detected to stop the execution of the command chain 1. At this time, if DmaMainToLocal #1 in the following command chain 2 is processed, then, at a time point of the DmaMainToLocal #1, the execution of the command chain 2 is also stopped. That is, if the break state is generated in a certain command chain, then, the command chain other than the certain command chain also becomes the break state. In this case, the command being processed at the timing at which the break state is generated is processed as it is, and at the time point at which the commands are respectively ended, the execution of the command chain to which the command of interest belongs is stopped.

When the control section 330 receives the release signal, the state machines 321 and 322 are instructed to release the break state, and the execution of the command chains is resumed.

[Operation of Information Processing System]

Figure 13:
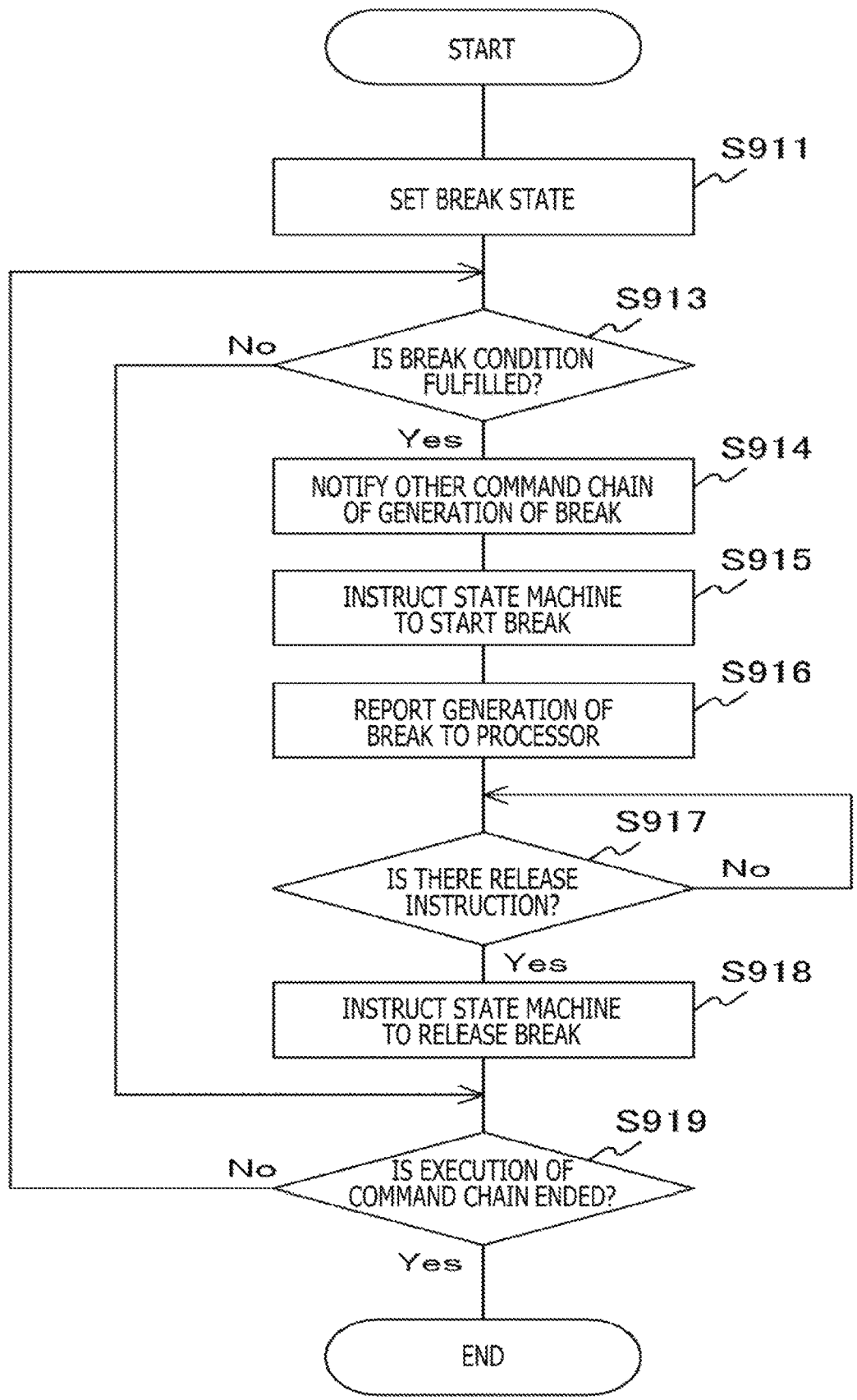
FIG. 13 is a flow chart depicting an example of a processing procedure in the control section 330 in the second embodiment of the present technology.

FIG. 13 is a flow chart depicting an example of a processing procedure in the control section 330 in the second embodiment of the present technology.

When the control section 330 is instructed to set the stop condition from the processor 100, the control section 330 sets the stop condition (Step S911). When the processing for the command chain 1 is started, the control section 330 monitors the processing state notified from the state machines 321 and 322, and decides whether or not the set stop condition is fulfilled (Step S913).

Then, when the control section 330 detects that the stop condition is fulfilled in one command chain (Yes: Step S913), the control section 330 notifies one of the state machines 321 and 322 corresponding to another command chain of the generation of the break state (Step S914). In addition, the control section 330 instructs the state machine 320 to start the break (Step S915). As a result, the break state is obtained. At this time, the control section 330 reports the generation of the break state to the processor 100 (Step S916).

Thereafter, when the control section 330 receives the release signal from the processor 100 (Yes: Step S917), the control section 330 instructs the state machines 321 and 322 to release the break state (Step S918). As a result, the break state is released.

On the other hand, either in the case where the stop condition is not detected (No: Step S913) or in the case where the break state is released (Step S918), it is decided whether or not the execution of the command chain is ended (Step S919). When the execution of the command chain is ended (Yes: Step S919), the processing procedure is ended. On the other hand, in the case where the execution of the command chain is not ended (No: Step S919), the pieces of processing in and after Step S913 are repetitively executed.

In such a manner, according to the second embodiment of the present technology, if the break state is generated in any one of the command chains when a plurality of sets of command chains is executed in parallel, the execution of the other command chains is also stopped in conjunction with one another, and the debug work can be performed in units of the commands.

It should be noted that the above embodiments depict an example for embodying the present technology, and the matters in the embodiments and the invention-specific matters in CLAIMS have the correspondence relationship. Likewise, the invention-specific matters in CLAIMS and the matters with the same names given in the embodiments of the present technology have the correspondence relationship. However, the present technology is by no means limited to the embodiments, and various changes are made for the embodiments without departing from the subject matter, thereby enabling the present technology to be embodied.

In addition, the processing procedures described in the above embodiments may be grasped as a method having these series of procedures, or may be grasped as a program causing a computer to execute these series of procedures or a recording medium recording the program. For example, a compact disc (CD), a minidisc (MD), a digital versatile disc (DVD), a memory card, a Blu-ray (registered trademark) Disc (Blu-ray disc) or the like can be used as the recording medium.

It should be noted that the effects described in the present description are merely an exemplification and are by no means limited, and other effects may also be offered.

It should be noted that the present technology can also adopt the following constitutions.

(1) An arithmetic processing apparatus including:

a command register group holding commands issued from a processor in respective registers with a command chain including a plurality of commands as a unit;

a command processing section processing the commands supplied from the command register group;

a state machine managing processing states of the commands in the command processing section; and a control section previously setting a condition under which stop is to be performed in the command chain as a stop condition and causing to stop the processing in the command processing section on the basis of the previously set stop condition, and the processing states managed in the state machine.

(2) The arithmetic processing apparatus according to (1) described above, in which the control section causes to stop processing in the command processing section at a time point at which processing for the commands fulfilling the stop condition ends without waiting for end of processing for all commands in the command chain.

(3) The arithmetic processing apparatus according to (1) or (2) described above, in which the control section sets a plurality of the processing states in the command processing section as the stop condition.

(4) The arithmetic processing apparatus according to any one of (1) to (3) described above, in which the control section, when receiving a command to release processing stop from the processor, causes to resume processing in the command processing section.

(5) The arithmetic processing apparatus according to any one of (1) to (4) described above, in which the state machine causes to make transition of the processing states in accordance with the number of commands previously decided in response to the command chain to manage the processing state.

(6) The arithmetic processing apparatus according to any one of (1) to (5) described above, in which the command register group includes a plurality of sub-register groups, and the control section performs the control in such a way that when receiving a plurality of the command chains from the processor, the different command chains are held for each of the plurality of sub-register groups.

(7) The arithmetic processing apparatus according to (6) described above, in which the state machine manages the peculiar processing states in response to the different command chains, respectively.

(8) The arithmetic processing apparatus according to (6) or (7) described above, in which the control section, in a case where the stop condition is fulfilled in one of a plurality of the command chains, causes to stop the processing in the command processing section even in the other command chains.

(9) The arithmetic processing apparatus according to any one of (6) to (8) described above, in which the control section, in a case where the stop condition is fulfilled in one of a plurality of the command chains, causes to stop the processing in the command processing section at a time point at which the processing for the command being processed in the other command chains is ended.

(10) An information processing system including:
a processor issuing a plurality of commands with a command chain including the commands as a unit;
a command register group holding the commands issued from the processor in respective registers;
a command processing section processing the commands supplied from the command register group;
a state machine managing processing states of the commands in the command processing section; and
a control section previously setting a condition under which stop is to be performed in the command chain as a stop condition, and causing to stop the processing in the command processing section on the basis of the previously set stop condition, and the processing states managed in the state machine.

REFERENCE SIGNS LIST

100 Processor
101 Control bus
102 Memory bus
200 Shared memory
300 Coprocessor
301 Command buffer
310 Command holding section
311 Switch
312 Register group
313 Selector
320, 321, 322 State machine
330 Control section
332 Input register selecting flag
333 State machine selecting flag
334 Switch
335 Inversion section
360 Bus interface
370 Data transferring section
380 Arithmetic operation section
390 Proprietary memory

The invention claimed is:
1. An arithmetic processing apparatus, comprising:
a command register group includes a plurality of registers, wherein
the command register group is configured to hold, as a command chain, a plurality of commands issued from a processor,
each of the plurality of commands is held in a corresponding register of the plurality of registers, and
the command chain includes the plurality of commands as a unit;
a command processing section configured to execute a processing operation on the plurality of commands;
a state machine configured to manage a plurality of processing states of the plurality of commands in the command processing section; and
a control section is configured to:
set a stop condition in the command chain; and
stop, at a first time point, the processing operation on the plurality of commands in the command processing section based on the stop condition and the plurality of processing states managed in the state machine, wherein
the first time point corresponds to a time of completion of the processing operation for a set of commands of the plurality of commands, and the set of commands corresponds to the stop condition.

2. The arithmetic processing apparatus according to claim 1, wherein the control section is further configured to set the plurality of the processing states in the command processing section as the stop condition.

3. The arithmetic processing apparatus according to claim 1, wherein the control section is further configured to:
receive a release command from the processor, and
resume the processing operation in the command processing section.

4. The arithmetic processing apparatus according to claim 1, wherein the state machine is further configured to make, based on a count of the plurality of commands, a transition of the plurality of processing states to manage a specific processing state of the plurality of processing states.

5. The arithmetic processing apparatus according to claim 1, wherein
the command register group further includes a plurality of sub-register groups, and
the control section is further configured to:
receive a plurality of command chains from the processor; and
control the command register group to hold each of the plurality of command chains in a respective sub-register group of the plurality of sub-register groups.

6. The arithmetic processing apparatus according to claim 5, wherein the state machine is further configured to manage respective processing states of the plurality of command chains.

7. The arithmetic processing apparatus according to claim 5, wherein the control section is further configured to stop, based on the stop condition that is fulfilled in one of the plurality of the command chains, the processing operation in the command processing section in each of the plurality of command chains.

8. The arithmetic processing apparatus according to claim 5, wherein
the control section is further configured to stop, based on the stop condition that is fulfilled in one of the plurality of the command chains, the processing operation in the command processing section at a second time point, and
the second time point corresponds to a time of completion of the processing operation for a corresponding command in each of the plurality of command chains.

9. An information processing system, comprising:
a processor configured to issue a plurality of commands;
a command register group includes a plurality of registers, wherein
the command register group is configured to hold, as a command chain, the plurality of commands issued from the processor,
each of the plurality of commands is held in a corresponding register of the plurality of registers, and
the command chain includes the plurality of commands as a unit;
a command processing section configured to execute a processing operation on the plurality of commands;
a state machine configured to manage a plurality of processing states of the plurality of commands in the command processing section; and
a control section is configured to:
set a stop condition in the command chain; and
stop, at a specific time point, the processing operation on the plurality of commands in the command processing section based on the stop condition and the plurality of processing states managed in the state machine, wherein the specific time point corresponds to a time of completion of the processing operation for a set of commands of the plurality of commands, and the set of commands corresponds to the stop condition.

* * * * *